United States Patent [19]

Orth et al.

[11] Patent Number: 4,794,762
[45] Date of Patent: Jan. 3, 1989

[54] REFRIGERANT FLOW CONTROL SYSTEM

[75] Inventors: Charles D. Orth, Cedarburg, Wis.; Richard C. Barthel, Harwood Heights; Peter J. Malone, Rosemont, both of Ill.

[73] Assignee: Eaton Corporation, Cleveland, Ohio

[21] Appl. No.: 7,861

[22] Filed: Jan. 27, 1987

[51] Int. Cl.$^4$ ............................................. F25B 41/00
[52] U.S. Cl. ...................................... 62/203; 62/184; 62/227; 62/228.3
[58] Field of Search ............. 62/204, 208, 227, 228.3, 62/228.1, 184, DIG. 17, 158, 157, 231, 203

[56] References Cited

U.S. PATENT DOCUMENTS

| | | | |
|---|---|---|---|
| 3,226,943 | 1/1966 | Mitchell | 62/227 |
| 3,289,429 | 12/1966 | Beard | 62/227 X |
| 3,698,204 | 10/1972 | Schlotterbeck et al. | 62/206 |
| 3,777,240 | 12/1973 | Neill | 62/158 X |
| 3,872,685 | 3/1975 | Mathis | 62/196 |
| 4,459,819 | 7/1984 | Hargraves | 62/212 |
| 4,478,051 | 10/1984 | Ibrahim | 62/212 |
| 4,499,739 | 2/1985 | Matsuoka et al. | 62/212 |
| 4,527,399 | 7/1985 | Lord | 62/212 |
| 4,571,951 | 2/1986 | Szymaszek | 62/212 |

Primary Examiner—Harry B. Tanner
Attorney, Agent, or Firm—R. A. Johnston

[57] ABSTRACT

A refrigeration control system for cooling a vehicle passenger compartment having a compressor/pump for circulating refrigerant between an evaporator located for cooling the compartment air and a condenser located for ambient heat exchange. An expansion valve controls refrigerant flow from the condenser to the evaporator; and, a first thermistor senses directly the temperature of the refrigerant on the high pressure inlet side of the valve and a second thermistor senses refrigerant flow temperature on the low pressure discharge side of the valve. A microprocessor compares the first thermistor output with predetermined first upper and lower values and effects opening and closing of the compressor clutch switch for high pressure cut-off; and, a fan switch is opened and closed for energization and de-energization of a condenser cooling fan. The output of the second thermistor is compared with a second set of upper and lower limit values for responding to normal service duty cycling of the clutch; and, the microprocessor is effective upon sensing a predetermined temperature after an elapsed time interval to open the clutch switch in the event of low or insufficient refrigerant charge.

5 Claims, 4 Drawing Sheets

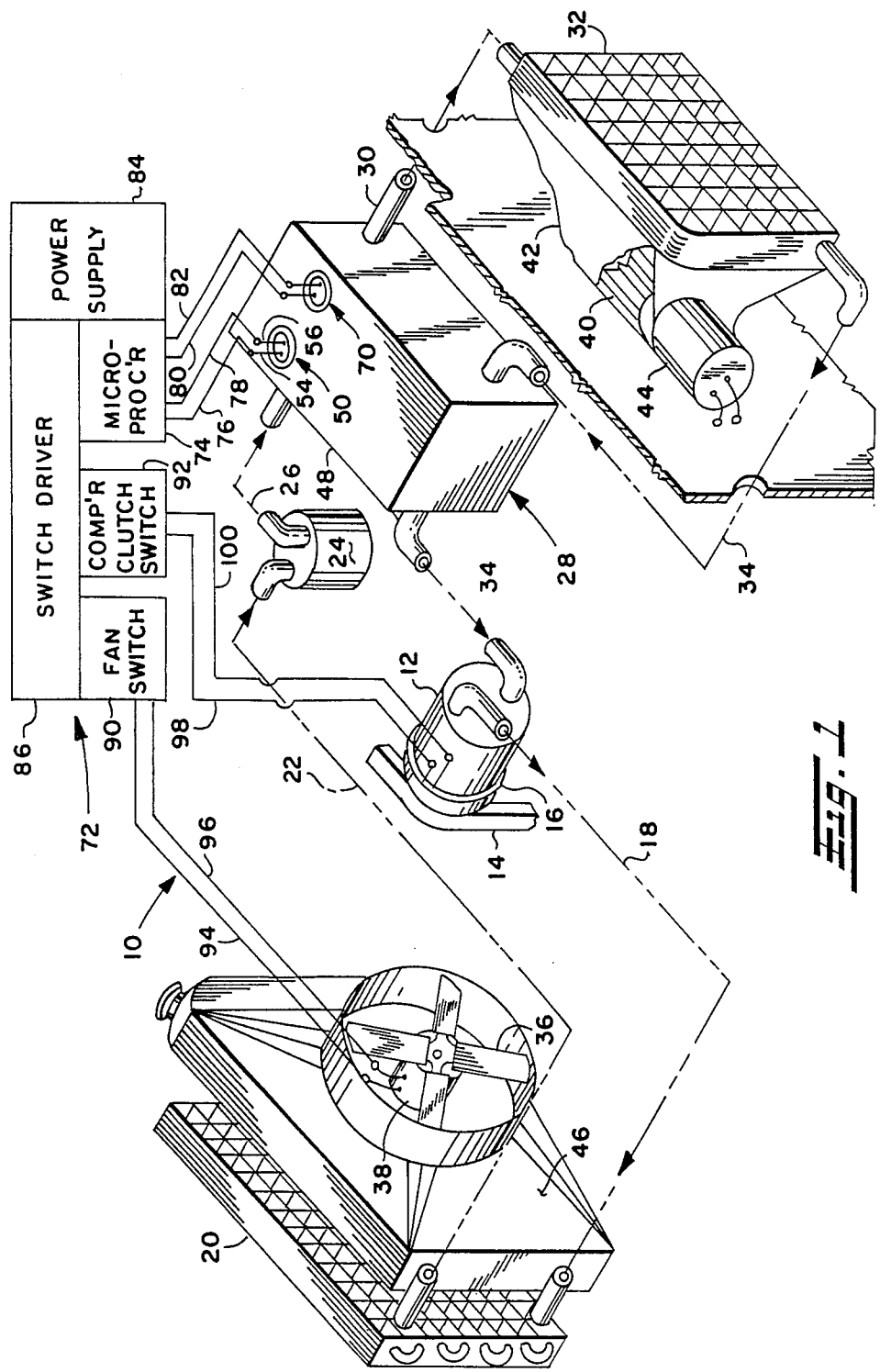

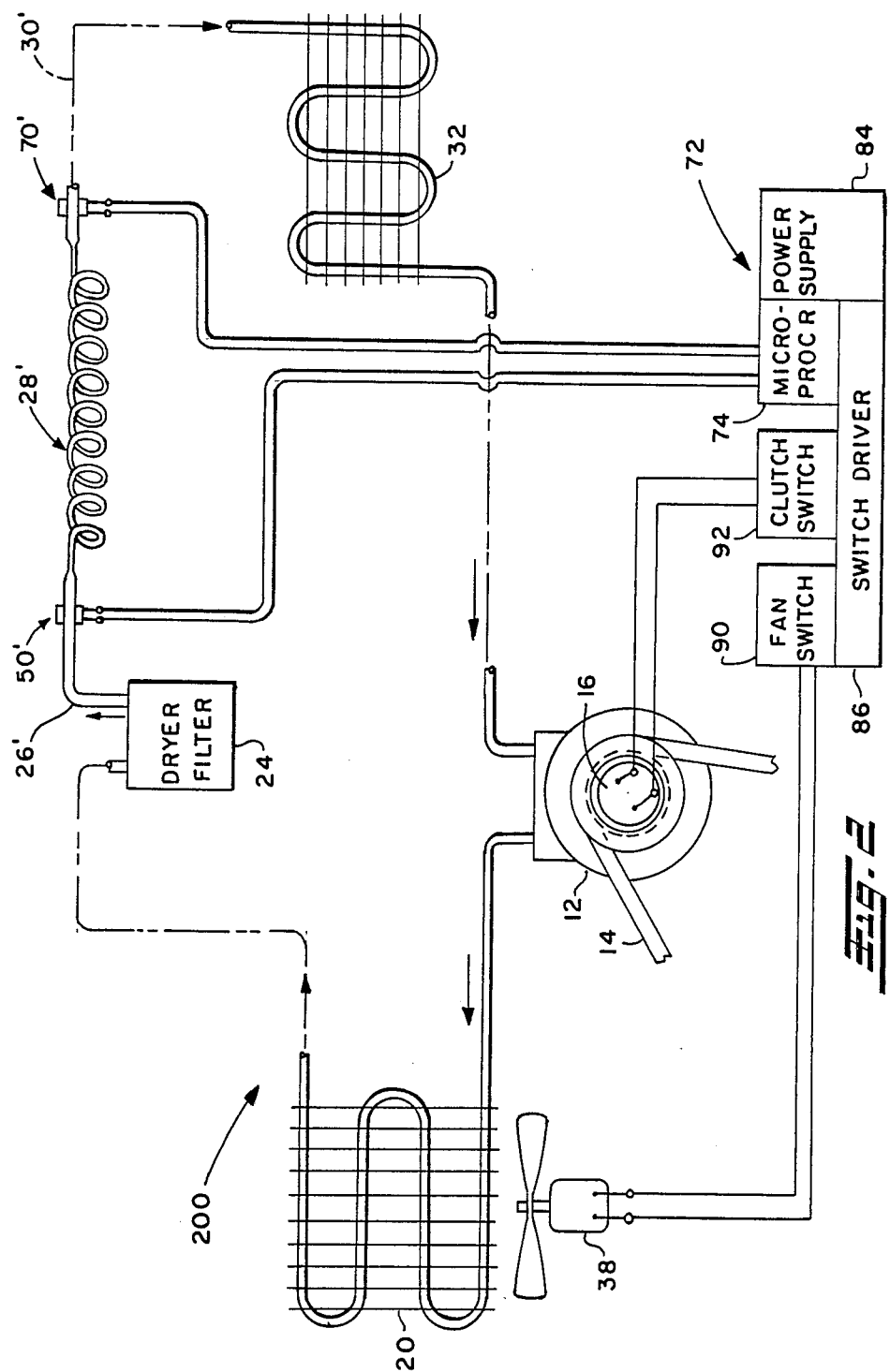

REFRIGERANT FLOW CONTROL SYSTEM

BACKGROUND OF THE INVENTION

The present invention relates to systems for controlling refrigerant cooling of a vehicle compartment such as the passenger compartment of an automobile. The system relates particularly to air conditioning systems for automobiles having a compressor/pump which circulates refrigerant between an exothermic heat exchanger, or condenser as it is commonly called, and an endothermic heat exchanger or evaporator located to have air blown thereover for cooling the passenger compartment. In systems of this type, flow control of the compressed and liquified refrigerant from the condenser is maintained by an expansion device such as a throttling capillary tube or an expansion control valve located to receive refrigerant flow from the condenser at its inlet and to discharge vaporized refrigerant at its outlet at a substantially lower pressure for circulation through the evaporator. Systems of this type are well known in the art and generally employ pressure sensing devices disposed in the flow path of the refrigerant to the evaporator or in the flow path of the refrigerant discharging from the evaporator to effect operation of the control valve or cut off of the compressor in response to excessive pressure in the refrigerant line.

One such commonly employed type of refrigerant expansion control valve employs a diaphragm exposed to refrigerant pressure leaving the valve. A bulb senses the temperature at the evaporator outlet and in response thereto, pressurizes a fluid filled chamber acting on the opposite side of the diaphragm. Movement of the diaphragm in response to the pressure differential thereacross, is employed to move a refrigerant flow control valve member. Such pressure responsive refrigerant expansion control valves thus function to control the flow of liquid refrigerant to the evaporator in response to demand, or rate of vaporization in the evaporator. The aforementioned pressure responsive valves have found widespread usage in automotive air conditioning systems because of their simplicity, low cost and reliability.

However such pressure responsive valves are limited in their control capability by virtue of their responsiveness to only the refrigerant superheat at the evaporator outlet. Thus, such known systems for controlling refrigerant flow in air conditioning systems, require a pressure sensing means in the evaporator flow circuit capable of sensing the differential pressure. Recently, it has been desired to provide an all electrically controlled air conditioning system for a vehicle, and particularly a system which could integrate the control of the electric compressor clutching mechanism in a common microcomputer employed for engine operating control.

Accordingly, it has been desired to provide a way or means of providing all electrical control of an automotive air conditioning system and yet retaining the advantages of the refrigerant expansion means known in the art. One such known expansion means comprises a pressure responsive diaphragm operated thermal expansion valve such as that shown in and described in U.S. Pat. Nos. 3,667,247 and 3,810,366 owned by the Assignee of the present invention. Alternatively, a simple capillary tube may be employed as an expansion means as is well known in the art.

SUMMARY OF THE INVENTION

The present invention provides a unique control system and method for controlling the operation of a refrigeration or air conditioning system employed for cooling the air in a compartment such as the passenger compartment of an automotive vehicle. The present invention utilizes known pressure sensitive expansion means for controlling the flow of refrigerant between an exothermic condenser and an endothermic evaporator disposed in the compartment to be cooled. In one embodiment the pressure and temperature sensitive control valve is employed and in another embodiment a fixed orifice capillary tube is employed as the expansion means.

The present invention provides an all electrical means of controlling the system by employing a microprocessor to control switch drivers or relays to open and close a switch for cycling a clutch which energizes and de-energizes the refrigerant compressor, and another switch which energizes and de-energizes a fan or blower for forcing ambient air over the exothermic condenser. The microprocessor receives signals from temperature sensors in the form of thermistors, one disposed on the high pressure inlet side of the expansion means and a second on the low pressure discharge side of the expansion means. The sensors are thermistors which penetrate the wall of the flow path and directly sense the temperature of the refrigerant.

The microprocessor compares the sensed temperature at the inlet of the expansion means with predetermined upper and lower limits stored in memory for cutting in and out the compressor clutch in the event of a sensed temperature representing an over-pressure condition. The microprocessor also opens and closes the fan switch to cycle "ON" and "OFF" the cooling fan for the exothermic condenser. The temperature sensed at the discharged side of the expansion means is compared with predetermined upper and lower limits in memory after a predetermined elapsed time from compressor start-up to cut "OFF" the compressor in the event of a low pressure or insufficient charge of refrigerant. The outlet temperature is also compared with predetermined values for normal duty cycling of the compressor to maintain the desired refrigerant temperature entering the evaporator. Thus, the control system of the present invention can control compressor operation independently of the control of refrigerant flow in the expansion means.

The present invention thus enables an onboard all electrical control of a refrigeration or air conditioning system for a vehicle without the need to change or modify the pressure responsive expansion means employed for normal refrigeration or cooling operation.

BRIEF DESCRIPTION OF THE DRAWINGS

FIG. 1 is a pictorial illustrating the refrigerant flow and diagram of the control system of the present invention employing a pressure responsive refrigerant expansion valve;

FIG. 2 is a pictorial of an alternate embodiment of the invention employing a capillary tube as the refrigerant expansion control means;

DETAILED DESCRIPTION

Figure 3A:
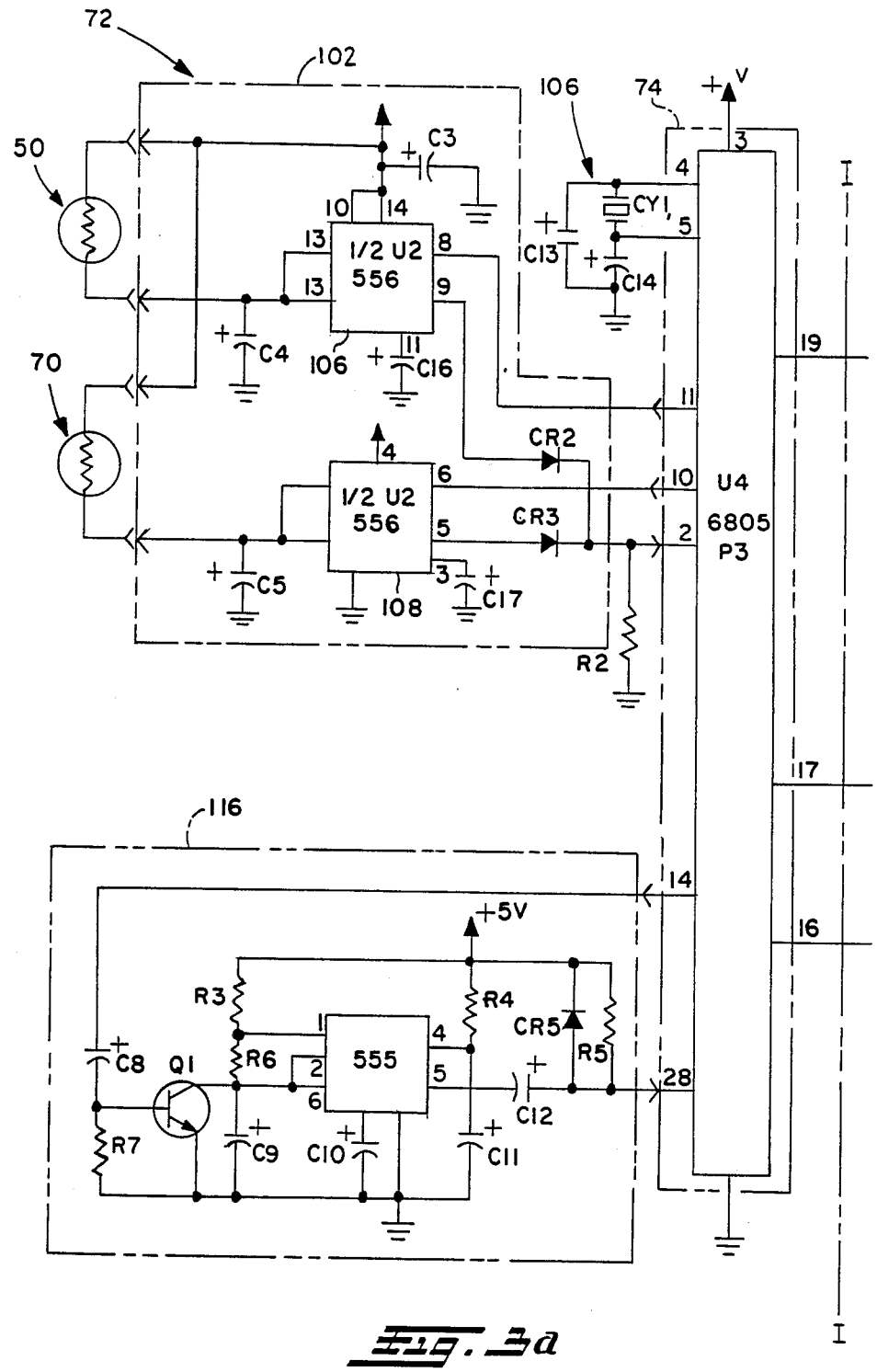
FIG. 3a is a portion of the electrical circuit of the present invention which has been divided along parting line I—I.

Referring to FIG. 1, the control system of the present invention indicated generally at 10 has a refrigerant compressor/pump 12 which is driven by an onboard source of power, as for example, power belt 14 received over a pulley for driving the compressor shaft upon energization of an electric clutch 16. The compressor 12 provides a source of compressed refrigerant in gaseous form, such as freon 12, pumped through conduit 18 to the inlet of an exothermic heat exchanger which condenses the refrigerant. The heat exchanger or condenser 20 discharges through conduit 22 and into a filter/dryer 24 which discharges through conduit 26 to the inlet of an expansion means indicated generally at 28. In the presently preferred practice of the FIG. 1 embodiment, the expansion means 28 comprises an expansion control valve. The expansion control valve 28 discharges at its outlet through conduit 30 to the inlet of an endothermic heat exchanger or evaporator 32 which absorbs heat from the compartment to be cooled and causes the liquid refrigerant to change state to a vapor form. The evaporator discharges through conduit 34 which passes through the body of the valve 28 and returns to the inlet side of the compressor 12.

A blower or fan 36 driven by an electric motor 38 is disposed to direct a flow of ambient air over the condenser 20 upon energization of the motor 38. If desired, a similar arrangement may be provided in FIG. 1 with a blower 40 disposed in a plennum 42 for directing a flow of either ambient of recirculated air over the evaporator 32 upon energization of motor 44 for driving the blower 40. If desired, the fan 36 may serve a dual purpose and direct the flow of air over the engine radiator and the condenser 20 by virtue of a fan shroud 46.

In the present practice of the FIG. 1 embodiment, the expansion valve 28 controls the flow of refrigerant therethrough by providing a means responsive to the evaporator superheat to control movement of a movable valve member. Typically, the valve 28 employs a diaphragm exposed to refrigerant pressure discharged from the valve. A bulb senses the temperature at the evaporator outlet and in response thereto, pressurizes a fluid filled chamber acting on the opposite side of the diaphragm. Movement of the diaphragm in response to the pressure differential thereacross is employed to move a refrigerant flow control valve member (not shown). This type of refrigerant expansion control valve thus functions to control the flow of liquid refrigerant to the evaporator in response to demand, or rate of vaporization in the evaporator. Such valves are well known in the art and the choice f the particular type of valve forms no part of the present invention. However, as illustrated in FIG. 1, and the presently preferred practice, the valve 28 has an aluminum block body 48 and the conduit 34 passes therethrough or return flow to the compressor sunction port.

Figure 4:
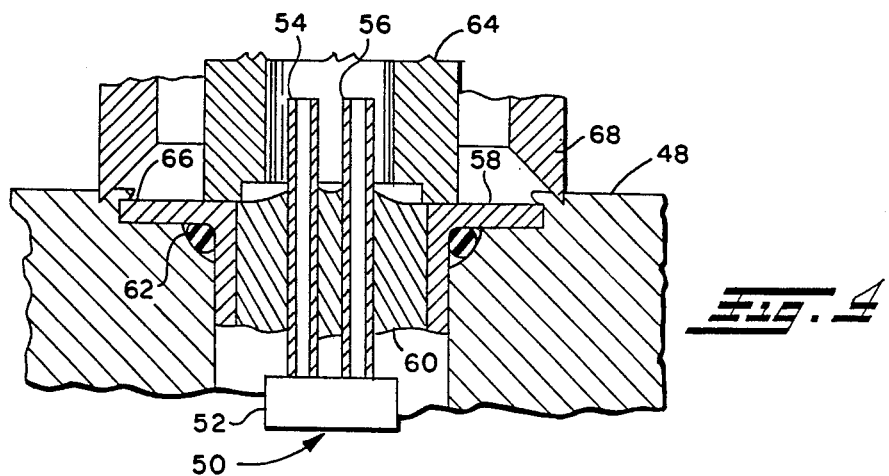

Referring to FIGS. 1 and 4, a temperature sensor is installed through the valve block 48 and communicates directly with the flow of refrigerant entering the valve 28 at the inlet thereof. The sensor 50 preferably comprises a thermistor 52 having a pair of electrical connector tubes 54, 56 extending upwardly from the thermistor. The thermistor is suspended from an annular flange 58 by fused glass insulating material 60 which has the connector tubes 54, 56 embedded therein and extending therethrough. An annular flange 58 is received in a recess formed in the valve block 48 and a seal provided therebetween by a suitable 0-ring 62. Upon installation, the 0-ring is compressed by a fixture 64 urged against the upper surface of flange 58 and a sufficient amount of material of the valve block is deformed over the edge of the flange as denoted by the reference numeral 66 by a suitable forming tool 68 to retain the flange.

A second thermistor indicated generally at 70 is disposed in a similar manner as the thermistor 50 through the valve block 48 adjacent the discharge outlet conduit 30 for sensing the temperature of the reduced pressure refrigerant as it enters the evaporator conduit 30. It will be understood that the thermistor 70 is mounted preferably as illustrated in FIG. 4. The present practice of the invention, the thermistors 50, 70 each employs a sensing element such as denoted by reference numeral 52 in FIG. 4 in the form of a resistance having a negative temperature coefficient. One commercially available negative coefficient device which has been found to be satisfactory, is obtainable from Fenwall Electronics Division of Kidde Corp., 63 Fountain Street, Framingham, Mass. 01701, and bearing manufacturers type designation UUR43J24. It will be understood, however, that other types of thermistors may be used.

Referring to FIG. 1, the electrical controller is indicated generally at 72 and includes a microprocessor 74 connected to receive inputs from the temperature sensing thermistor 50, connected to the thermistor connectors 54, 56 through leads 76, 78. Leads 80, 82 are connected to the thermistor 70 and to the microprocessor.

The microprocessor 74 receives electrical power from power supply 84, and is connected through a switch driver or relay network 86 which is operative to effect opening and closing of a fan switch 90 and separate compressor clutch switch 92. The fan switch is connected to fan motor 38 via leads 94, 96 and the compressor clutch switch is connected to clutch 16 by leads 98, 100.

In the present practice, the control system of the invention has been found satisfactory for operation with currently used automotive air conditioning systems. One such system which has been found to operate satisfactorily with the present invention employs an evaporator 32 operating with approximately a 25 psi (1.75 kg/cm$^2$) fluid pressure drop thereacross, e.g. pressure differential between the conduit 30 at the inlet and conduit 34 at the outlet; however, the invention is capable of use in systems having different valves of evaporator pressure drop.

In the present practice of the invention, it has been found satisfactory to provide, upon initial start-up, an initial duty cycle of three (3) minutes where the temperature of refrigerant at the evaporator inlet, as sensed by the thermistor 70, is higher than 28° C. Thereafter, the temperature readings of the thermistor 70 and thermistor 50 are sampled at the rate of approximately one sample reading each ¼ to ¾ of a second. Preferably, a minimum compressor run-time has been set in the range of 5–10 seconds. During normal cooling operation, when the refrigerant temperature sensed by thermistor 70 reaches 7.2° C, which is a predetermined chosen value, the compressor clutch 16 is turned "ON"; and, when the thermistor 70 sensed temperature $T_{70}$ falls to minus 5.5° C, which is a predetermined chosen value, the clutch is cycled "OFF".

Upon initial startup of the compressor 12 at time $t_0$, if at $t_0$ plus one minute $T_{70}$ is greater than 5.5° C, the compressor is cycled "OFF" as an indication of low refrigerant charge. In the event $T_{70}$ is greater than 5.5° C at $t_0$ plus five minutes, the compressor is cycled "OFF" as an indication that the system is out of refrigerant charge. If an operating condition exists such that the temperature sensed by thermistor 70, $T_{70}$, reaches 51° C the compressor clutch is de-energized as an indication that a high pressure condition exists in the system. Normally, automotive passenger vehicle systems employing the present invention would have a compressor discharge pressure or high side inlet pressure to the expansion means 28 of 150-250 psi, (17.5-21 Kg/cm$^2$) In the event the compressor discharge pressure exceeds this range, the sensed temperature $T_{70}$ is greater than 51° C as an indication of over pressure. In the event that, after an over pressure condition, the pressure of the refrigerant drops to within the normal range, as a sensed temperature $T_{50}$, the compressor is cycled "ON". As sensed temperature $T_{50}$ rises to 35° C, the microprocessor is operative to effect operation of fan switch 90 to turn the fan motor 38 "ON"; and, when the sensed temperature $T_{50}$ falls to 33° C, the fan switch 90 is opened to turn the motor 38 "OFF".

Upon cold startup, in the event the temperature $T_{70}$ is at or below −20° C the clutch switch 92 is maintained in the "OFF" position by the microprocessor as an indication of low pressure until the ambient air has warmed the system sufficient to enable compressor startup.

Figure 3B:
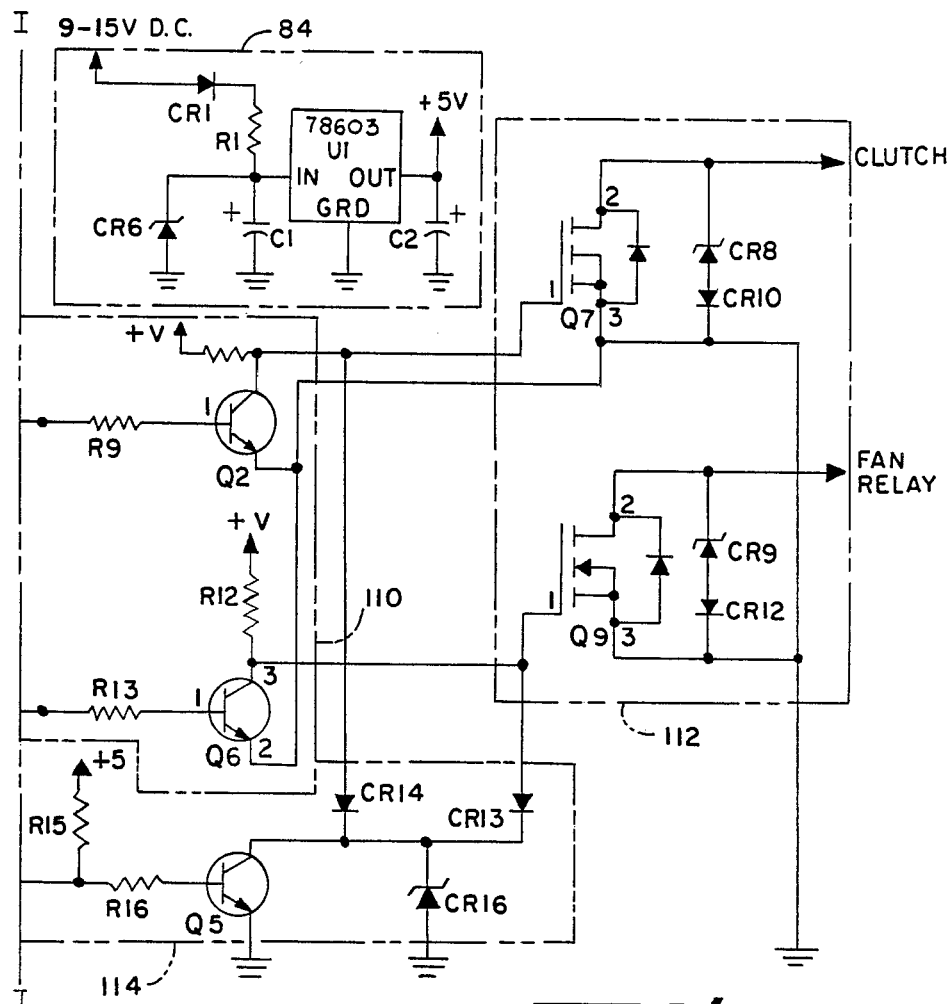
FIG. 3b is a portion of the electrical circuit of the present invention provided along parting line I—I; and, FIG. 4 is a section view taken through the wall of the conduit showing a typical temperature sensor installation.

Referring now to FIGS. 3A and 3B, the electrical schematic for the control module 72 is illustrated and is divided along the parting line I—I for ease of illustration. The values for resistors and capacitors and identification of the other solid state circuit components are given in FIG. 1 and have been omitted from the drawings for clarity. In FIG. 3A, the components bounded by the dashed outline denoted 102, comprise the signal conditioning analog-to-pulse width converter for the input signals from the thermistors 50, 70. The temperature output signal of each of the thermistors 50, 70 is read by the microprocessor indicated by the dashed outline at 104. The charging time respectively of the capacitors C4 and C5, which is varied by the changing resistance of the thermistors 50, 70 is timed by the microprocessor to generate a signal having the pulse width thereof varied in accordance with the changes in resistance of the thermistors. A crystal oscillator network is provided for timing as indicated generally at 106. The microprocessor 104 receives the temperature signal from thermistor 50 and is connected to the oscillator at pins 4 and 5 of the microprocessor. The signal from the thermistor 70 is applied to the microprocessor 104 at pins 2 and 10. In the present practice, the microprocessor 104 comprises a commercially available device bearing a type designation 6805 P3.

In operation, the microprocessor typically pulses through pin 2 a timing device denoted 106, which preferably comprises a commercially available type 556 device, to commence charging the capacitor C4. When the capacitor C4 is charged to $\frac{2}{3}$ $V_{CC}$ or positive 5 volts dc, the output of device 106 is applied to pin 11 of the microprocessor 104 for signalling the end of the time period. The microprocessor then compares the signal from thermistor 50 with a value from memory and outputs a signal to the predriver indicative of the comparison.

A timing device 108 is provided for charging a capacitor C5 which provides a signal at pin 10 of the microprocessor 104 indicative of the output of thermistor 70. The microprocessor then compares the output of the timing device 108 with a value in memory and provide an output indicative of the comparison.

Referring to FIG. 3B, the components bounded by the dashed outline denoted 110 comprises a predriver circuit which operates in conjunction with driver circuit indicated by dashed outline denoted 112 and the components 110 and 112 together comprise the switch driver, fan switch and compressor clutch switch denoted by reference numbers 86, 90 and 92 respectively in FIG. 1.

The driver circuit 112 includes power FET's Q7 and Q9, with the output of device Q7 connected to the compressor clutch 16 via leads 98, 100. The output of FET driver Q9 is connected to the fan motor, via leads 94, 96

It will be understood that in the event the power loading of the fan motor 38 exceeds the power rating of FET Q9, a relay (not shown) may be interposed between the driver Q9 and the fan motor 38. In the present practice of the invention, the driver Q7 has a sufficient power rating to handle the switching of the compressor clutch without the necessity of an intermediate relay; however, if desired a relay may be employed for energization of the clutch 16.

The circuit components bounded by dashed outline denoted 114 in FIG. 3B comprise a master defect circuit having a switching device Q5 which is normally "ON" and effective to ground drivers Q7 and Q9 until an output is received from pin 16 of the microprocessor 104 whereupon Q5 is switched "OFF" thereby enabling drivers Q7 and Q9.

The circuit components bounded by the dashed outline denoted by the reference numeral 84 comprises the power supply and voltage regulator which provides a regulated positive five volts d.c. for the solid state components from the 12 volt d.c. onboard vehicle supply. The power supply includes a solid state device U1 having a standard type 78603 designation.

Referring to FIG. 3A, the circuit components bounded by the dashed outline and denoted by the reference numeral 116 comprise a timer circuit which times out and resets the microprocessor 104 unless the timer circuit is continually refreshed by the microprocessor from a pulse at pin 14. During normal microprocessor operation, a pulse is generated once each 70 milliseconds and the circuit 116 thereby permits continued operation of the microprocessor only if operation is normal. In the event of a malfunction of a microprocessor, failure to provide a pulse at pin 14 will cause the circuit 116 to time out and cut off the outputs to the predriver circuit 110.

TABLE I

| Capacitances (Microfarads) | Resistances (Ohms) | Other Devices |
|---|---|---|
| C1 10 | 1 56 | Q1 2N3904 |
| 2 0.1 | 2 10K | Q2 2N3904 |
| 3 0.1 | 3 100K | Q3 2N3904 |
| 4 0.1 | 4 30K | Q4 — |
| 5 0.1 | 5 10K | Q5 2N3904 |
| 6 — | 6 1K | Q6 2N3904 |
| 7 — | 7 1.2K | Q7 BTS130 |
| 8 .01 | 8 1K | Q8 — |
| 9 0.1 | 9 22K | Q9 BTS130 |
| 10 .01 | 10 — | CR1 MRL005 |
| 11 2.2 | 11 — | 2 1N914 |

TABLE I-continued

| Capacitances (Microfarads) | Resistances (Ohms) | Other Devices |
|---|---|---|
| 12  2.2 | 12  1K | 3  1N914 |
| 13  18 pico Fd | 13  2.2K | 4  1N914 |
| 14  18 pico Fd | 14  — | 5  — |
| 15  — | 15  10K | 6  1N4746Zener |
| 16  .01 | 16  2.2K | 7  — |
| 17  .01 |  | 8  Zener, 5 Watt, 24 V |
|  |  | 9  Zener, 1 Watt, 24 V |
|  |  | 10  1N914 |
|  |  | 11  — |
|  |  | 12  — |
|  |  | 13  1N914 |
|  |  | 14  — |
|  |  | 15  — |
|  |  | 16  18 V Zener |
|  |  | CY  14 May W3 |

Referring now to FIG. 2, an alternative embodiment of the invention is indicated generally at 200 and is similar to the embodiment denoted 10 in FIG. 1 with the exception that the expansion means indicated generally at 28', comprises a small diameter capillary or orifice tube instead of a movable valve member. In the embodiment of FIG. 2, the thermistor 50' is located through the wall of conduit 26' at the high pressure inlet end of the capillary 28'; and, the low pressure side thermistor 70' is located directly through the wall of the conduit 30' connecting the discharge from the capillary to the evaporator inlet. The thermistors 50', 70', in the embodiment 200 of FIG. 2, may be installed through the wall of the respective conduits and retained therein by by the same technique as employed in the FIG. 1 embodiment and as illustrated in FIG. 4. It may, however, be necessary to first attach a boss to the conduit as for example by brazing or high temperature soldering to provide the necessary attachment surfaces for the thermistor flange 58.

The present invention thus provides a unique and novel way of controlling compressor clutch cycling and condenser cooling fan cycling in a system for air conditioning a compartment such as an automotive passenger compartment. The invention employs temperature sensors for sensing the temperature of the refrigerant entering and discharging from the high pressure refrigerant expansion means; and, the temperature outputs from the sensors are compared with predetermined values stored in the memory of a microcomputer. The invention is operative to provide electrical control signals indicative of the comparison for controlling "ON" and "OFF" cycling of the compressor and condenser cooling fan upon sensing certain temperature conditions representative of over pressure, low or insufficient refrigerant charge and low system pressure, and yet the invention retains the capability of employing a conventional pressure responsive thermal expansion valve.

Although the invention has hereinabove been described with respect to the illustrated embodiments and the presently preferred practice, it will be understood that the invention is capable of modifications and variations and is limited only by the scope of the following claims.

We claim:
1. A control system for air cooling a vehicle compartment comprising:
   (a) compressor means operative upon connection to a source of power to provide a flow of compressed refrigerant;
   (b) an exothermic heat exchanger disposed for ambient cooling and having the inlet thereof operatively connected to receive said flow of compressed refrigerant from said compressor means, said heat exchanger operative to cool said compressed refrigerant and effect condensation thereof;
   (c) expansion means operative to receive said condensed refrigerant and to discharge said refrigerant at a substantially reduced pressure;
   (d) an enodthermic heat exchanger operatively connected to receive the discharge of said expansion means and operative to absorb heat from the air in a compartment to be cooled;
   (e) a first temperature sensing means disposed to sense directly the temperature of said condensed refrigerant discharged from said condenser and entering said expansion means;
   (f) a second temperature sensing means disposed to sense directly the temperature of said flow of reduced pressure refrigerant discharging from said expansion means;
   (g) clutch means operative upon actuation and deactuation to drivingly connect and disconnect said compressor with a source of power;
   (h) fan means operative upon actuation to direct a flow of ambient air over said exothermic heat exchanger;
   (i) circuit means including switch means operative, in response to said first sensor means sensing a first predetermined upper limit temperature, deactuate said clutch means and upon said sensed temperature falling a predetermined amount below said first upper limit operative to actuate said clutch means, said second sensor means sensing a predetermined second upper limit and in response thereto during normal operation operative to actuate said clutch and operative at a first predetermined lower limit temperature to deactuate said clutch means and operative upon cold startup to deactuate said clutch means in response to sensing a second lower limit temperature lower than said first lower limit temperature, upon said first sensor means sensing a third predetermined upper limit temperature operative to actuate said fan means, and upon said first sensor means sensing a third predetermined lower limit temperature, lower than said second upper limit, operative to deactuate said fan.

2. A system for controlling refrigeration of a vehicle compartment comprising:
   (a) compressor means operative upon energization to discharge a flow of compressed refrigerant and having a suction return port;
   (b) condenser means connected to receive said flow of refrigerant and operative to lower the temperature thereof sufficiently to effect liquification of said refrigerant;
   (c) expansion means receiving said liquified refrigerant and operative to discharge same at a substantially lower pressure;
   (d) evaporator means having an inlet and outlet and disposed to receive at the inlet thereof said refrigerant discharged from said expansion means and operative to absorb heat from the compartment air to be refrigerated thereby causing said refrigerant to be evaporated to a gaseous state;

(e) conduit means connected to cause said evaporated refrigerant to flow from said evaporator means to said compressor suction port;

(f) clutch means operative upon engagement and disengagement to respectively energize and de-energize said compressor;

(g) fan means operative upon energization to direct a flow of air over said condenser;

(h) first temperature sensor means disposed to sense directly the temperature of said liquified refrigerant flow received by said expansion means from said condenser means and operative to provide an output indicative of the sensed temperature;

(i) second temperature sensor means disposed to sense directly the temperature of said refrigerant flow discharged from said expansion means and to provide an output indicative thereof;

(j) logic circuit means including switch means operative upon connection to a source of power compare said first sensor means output with a first predetermined upper and lower limit and operative for de-energizing said clutch means when said output is at or above said first upper limit, and operative to energize said clutch means when said output is at or below said first lower limit, said circuit means further operative to energize said clutch means when said second sensor means output is at or above a second lower limit less than said first upper limit.

3. The system defined in claim 2, further comprising fan means operative to direct a flow of air over said condenser means; and, said circuit means is operative to energize said fan means when said first sensor means output is a predetermined differential above said first lower limit, and to de-energize said fan when said first sensor means output is at or below said first lower limit.

4. The system defined in claim 2, wherein said circuit means is operative upon start-up to compare said second sensor means output with a third lower limit less than said second lower limit and to de-energize said clutch means when said second sensor means output is at or below said third level.

5. The system defined in claim 2, wherein said first and second sensor means each comprise a thermistor with the resistance element thereof directly exposed to the refrigerant flow.

* * * * *